United States Patent Office 2,930,777
Patented Mar. 29, 1960

2,930,777

SYNERGISTIC STABILIZER COMPOSITIONS FOR RUBBER COMPRISING AN N-NITROSO AROMATIC AMINE AND AN ALIPHATIC MONOAMINE

Harold M. Leeper and Dudley B. Merrifield, Charleston, W. Va., assignors to Monsanto Chemical Company, St. Louis, Mo., a corporation of Delaware No Drawing. Application July 19, 1955
Serial No. 523,118

10 Claims. (Cl. 260—45.9)

The present invention relates to improvements in rubber compounding and is particularly directed to the problem of preventing degradation of natural and synthetic rubbers.

The causes of degradation vary and a general object of the invention is to inhibit the various deleterious influences to which rubbers are subjected in service. A particular object of the invention is to prevent exposure cracking of sulfur vulcanizable rubbers. A further object is to provide rubber compositions containing amine anti-degradation agents which can be readily processed. A further object is to inhibit prevulcanization or scorch in rubber compositions containing cure-activating amines. Another object is to prevent the heat embrittlement of butadiene-styrene copolymer rubber. Still another object is to inhibit the aging of sulfur vulcanizable rubbers, whether natural or synthetic. A further object is to provide a combination of anti-degradation agents which exert a synergistic effect. Also, another object is to provide a combination of anti-degradation agents which economically inhibit degradation. Still another object is to improve the hysteresis of rubber vulcanizates.

One of the major problems of the rubber industry is the protection of vulcanizates of sulfur vulcanizable rubbers against exposure cracking, that is degradation of the vulcanizates due to ozone while under static or dynamic stress. The problem is a serious one, particularly with respect to the service life of rubber tires, and is aggravated by the fact that in general chemical antioxidants have little or no value in protecting vulcanizates against deterioration by ozone. Waxes which form a protective surface film are useful to inhibit exposure cracking if the rubber is not flexed but protection is lost once the film breaks. When a rubber surface, whether natural or synthetic, comes into contact with an atmosphere containing even a few parts ozone per million a myriad of cracks form on the surface. The cracks cohntinue to grow so that the useful life of the article rapidly terminates. The severity of the problem when rubber articles must be stored for a long time will be readily appreciated.

Deterioration of rubber due to aging is another well defined problem. The degradation is manifested in the case of natural rubber by loss of tensile strength and it is usually attributed to absorption of oxygen. It has long been known that such deterioration can be greatly retarded by treating the rubber before or after vulcanization with substances known as age resisters or antioxidants. The age resisting characteristics of a vulcanized rubber product can be readily ascertained by subjecting samples of the vulcanized rubber to the action of air or oxygen at elevated temperatures.

Aliphatic and mixed aliphatic-aromatic amines inhibit exposure cracking but the utility of common aliphatic and mixed amines is limited. They are accelerators and accelerator activators with a low critical temperature, weak age resisters and are generally deficient for preventing exposure cracking of butadiene-styrene copolymer rubber. However, it has now been discovered that treating rubber with an aliphatic amine or mixed aliphatic-aromatic monoamine, either the free amine or in the form of a salt, in conjunction with a nitroso aromatic amine achieves advantages unobtainable with either ingredient alone. The combination exerts a synergistic effect against aging, mitigates activation of cure, improves the resistance to exposure cracking, especially in synthetic rubber, lowers hysteresis and in general provides economical protection to rubber against degradation as well as improving the processing of the raw stocks and the physical properties of the vulcanizates.

The amines suitable for practicing the invention include common aliphatic monoamines whether primary, secondary, tertiary or mixtures thereof, and simple mixed aliphatic-aromatic monoamines. The organic substituent on the nitrogen will usually be a hydrocarbon radical but substitution is permissible, notably by cyano, halogen, hydroxy, keto, and lower alkoxy groups. Aliphatic groups include benzyl which is predominately aliphatic in properties, saturated bivalent radicals attached to a central nitrogen atom to complete a saturated heterocyclic ring and alicyclic as well as saturated and unsaturated open carbon chain radicals. Addition of the amine in the form of a salt is usually preferred and has the advantage of lowering volatility.

Salts of dicyclohexylamine have been studied extensively and found to be generally effective. Fatty acid salts are fully equivalent to the free amine if added to provide an equivalent amine content. The preferred salts are the stearate, acetate, oleate, adipate, oxalate, formate, nitrite, toluene sulfonate and dodecylbenzene sulfonate. Less desirable are the benzoate, salicylate and phthalate. A combination of dicyclohexylamine and a nitroso aromatic amine is an outstanding general purpose anti-degradation agent for natural and synthetic rubbers.

Many other aliphatic amines inhibit exposure cracking, especially of natural rubber. Examples of aliphatic amines which have been tested and found suitable for use in practicing the invention comprise: cyclohexylamine stearate, N-methylcyclohexylamine, N-methylcyclohexylamine acetate, N - methylcyclohexylamine stearate, N-2-cyanoethylcyclohexylamine, N-2-chloro-allylcyclohexylamine, N-(3-chloro-2-butenyl)cyclohexylamine, N-nonenylcyclohexylamine, N-dodecenylcyclohexylamine, N-dodecylcyclohexylamine, N-methyldicyclohexylamine, N-methyldicyclohexylamine formate, N-methyldicyclohexylamine stearate, 2-dicyclohexylaminoethanol, dicyclohexylamino-2-propanone, N-butyldicyclohexylamine, N,N - dimethylcyclohexylamine, N,N - dimethylcyclohexylamine, stearate, dibutylamine, dibutylamine oleate, diamylamine, dioctylamine, diethanolamine, morpholine, morpholine stearate, N-2-cyanoethylbutylamine.

The mixed aliphatic-aromatic amines contemplated contain in addition to an aliphatic substituent which is preferably one or more cyclohexyl groups, one monovalent aromatic substituent attached to nitrogen. By monovalent is meant that the aromatic group is linked to the residue of the molecule containing the amino substituent by a single valence and is linked to only one amino substituent. Examples of mixed amines which have been tested and found suitable for practicing the invention comprise, N-cyclohexylaniline, N-cyclohexyl-p-phenetidine, N-cyclohexyl-o-hydroxyaniline, N-2-cyanoethylaniline, N-2-cyanoethyl-p-toluidine, N-2-cyanoethyl-p-amylaniline, N-ethyl-p-phenetidine, N-benzyl-p-phenetidine, N-2-cyanoethyl-p-phenetidine, N-2-cyanoethyl-o-phenetidine, N-allyl-p-phenetidine, N,N-diethyl-p-phenetidine and N,N-dimethylaniline stearate.

Nitroso aromatic amines suitable for use in practicing the invention have been disclosed in the chemical and patent literature. These include age and exposure cracking resistors but vulcanizates containing sufficient nitroso compound to afford a practical level of protection are deficient in hysteresis. However, the effect can be overcome and compensated completely by use in conjunction with an amine. Nitroso aromatic amines are represented by N-nitroso-di-β-naphthylamine, N-nitrosodiphenylamine, N-nitroso-di-α-naphthylamine, N-nitrosophenyl - β - naphthylamine, N - nitrosophenyl - α - naphthylamine, N-nitroso-di-o-tolylamine, N-nitrosophenyl-o-tolylamine, N-nitrosophenyl-p-tolylamine, N-nitrosobenzylphenylamine, N-nitroso-N-methylaniline, N-nitroso-N - ethylaniline, N - nitroso - N - β - naphthylphenetidine, N,N' - dinitrosodiphenyl - p - phenylenediamine, N,N' - dinitroso - dinaphthyl - p - phenylenediamine and the N-nitroso derivative of the reaction product of diphenylamine and acetone. The latter is described in U.S. Patent 1,945,577 to ter Horst. Still other examples are the N-nitroso-2,2,4-trimethyl-1,2-dihydroquinolines disclosed in U.S. Patent 2,268,419 to Paul. Further examples of effective compounds are N-nitroso-N-aryl-N-alicyclic or alkyl p-phenylenediamines, as for example N-cyclohexyl - N,N' - dinitroso - N' - phenyl - p - phenylenediamine, N - cyclohexyl - N' - (2 - naphthyl) - N,N' - dinitroso - p - phenylenediamine, N,N' - dinitroso - N-phenyl - N' - hexyl - p - phenylenediamine, N,N' - dinitroso - N - phenyl - N' - octyl - p - phenylenediamine, N,N' - dinitroso - N - phenyl - N' - decyl - p - phenylenediamine, N - nitroso - N - phenyl - N' - cyclohexyl-p-phenylenediamine disclosed in copending application of Ching C. Tung, Serial No. 444,347, filed July 19, 1954. Still further examples are N-nitroso-N,N'-dialkyl arylenediamines, as for example N,N'-dicyclohexyl-N,N'-dinitroso - p - phenylenediamine, N,N' - di - sec - butyl - N,N' - dinitroso - p - phenylenediamine, N,N' - diisobutyl-N,N' - dinitroso - p - phenylenediamine, N,N' - dihexyl-N,N' - dinitroso - p - phenylenediamine, N,N' - dihexenyl - N,N' - dinitroso - p - phenylenediamine, N,N' - dioctyl - N,N' - dinitroso - p - phenylenediamine, N,N'-dioctenyl - N,N' - dinitroso - p - phenylenediamine, N,N'-diheptyl - N,N' - dinitroso - p - phenylenediamine, N,N'-diheptenyl - N,N' - dinitroso - p - phenylenediamine, N,N' - dinonyl - N,N' - dinitroso - p - phenylenediamine, N,N' - dinonenyl - N,N' - dinitroso - p - phenylenediamine, N,N' - didecyl - N,N' - dinitroso - p - phenylenediamine, N,N' - didecenyl - N,N' - dinitroso - p - phenylenediamine, N,N' - diundecyl - N,N' - dinitroso - p-phenylenediamine, N,N' - diundecenyl - N,N' - dinitroso-p - phenylenediamine, N,N' - didodecenyl - N,N' - dinitroso - p - phenylenediamine, N,N' - dibutyl - N,N'-dinitroso - p - phenylenediamine, N,N' - di -sec -butyl-N,N' - dinitroso - p - phenylenediamine, N - sec - butyl-N' - isopropyl - N,N' - dinitroso - p - phenylenediamine, N - sec - butyl - N' - cyclohexyl - N,N' - dinitroso - p-phenylenediamine and N,N' - dicyclohexyl - N - nitroso-p-phenylenediamine. The preparation of these compounds is described in copending application Serial No. 508,820, filed May 16, 1955.

Specific embodiments of the invention which illustrate the anti-exposure cracking properties and scorch resistance of the combinations were prepared from the following base formulations:

| | Parts by Weight | |
|---|---|---|
| Smoked sheets | 100.0 | |
| Butadiene-styrene copolymer rubber [1] | | 100.0 |
| Carbon black | 50.0 | 50.0 |
| Zinc oxide | 5.0 | 4.0 |
| Stearic acid | 3.0 | 2.0 |
| Saturated hydrocarbon softener | 3.0 | 10.0 |
| Sulfur | 2.5 | 1.75 |
| Cyclohexyl 2-benzothiazolesulfenamide | 0.5 | 1.2 |

[1] GR-S 1500.

Using these base formulae stocks were compounded by adding the ingredients shown below. The resistance of the raw compounds to scorch was evaluated by means of a Mooney plastometer. The scorch point was taken as the point on the plasticity curve when the plasticity had risen 10 points above the minimum value.

Table I

| Stock | 1 | 2 | 3 |
|---|---|---|---|
| | Parts by weight | | |
| Dicyclohexylamine stearate | 1.5 | 1.5 | 1.5 |
| N,N'-Dinitroso-N,N'-diphenyl-p-phenylenediamine | | 0.5 | |
| 6-Ethoxy -1,2- dihydro-2,2,4- trimethyl-1- nitrosoquinoline | | | 0.5 |
| Mooney Scorch, minutes: | | | |
| Natural rubber, 121° C | 12 | 19 | 17 |
| GR-S rubber, 135° C | 17 | 20 | 18 |

It will be noted that the addition of a nitroso aromatic amine significantly increases the resistance to scorch. In another experiment, replacing 0.5 part of the dicyclohexylamine stearate in stock 1 by N-nitroso-2,2,4-trimethyl-1,2-dihydroquinoline, or in other words adding to the base stocks 1.0 part of dicyclohexylamine stearate and 0.5 part of the nitrosoquinoline, prolonged the period before scorch 7 minutes in the natural rubber base and 3 minutes in the GR-S rubber base.

The increased resistance to exposure cracking was demonstrated by vulcanizing the GR-S rubber stocks in the usual manner by heating in a press for 60 minutes at 144° C. and determining the resistance of the vulcanizates to cracking by ozone. For reasons already explained, evaluation under static conditions is not indicative of the service life of rubber articles which must withstand flexing so the vulcanized compositions were evaluated under dynamic conditions in an atmosphere containing a definite concentration of ozone. Samples of the stocks were cured in the form of a belt ½" wide, ¼" thick and 5 5/16" inside diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed are described in Analytical Chemistry, vol. 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The base stock alone was severely cracked in 40 hours and the cracking extremely severe after 48 hours exposure. The results of the tests are set forth below:

Table II

| Stock | Surface Cracking After Flexing in Ozone for— | | | | |
|---|---|---|---|---|---|
| | 32 Hours | 40 Hours | 48 Hours | 56 Hours | 64 Hours |
| 1 | none | none | v. slight | slight | slight. |
| 2 | do | do | none | none | none. |
| 3 | do | do | v. slight | v. slight | v. slight. |

Further specific embodiments of the invention illustrate the effect of replacing part of the amine with a nitroso aromatic amine. The compositions were compounded from the base stocks described above.

Table III

| Stock | 4 | 5 | 6 | 7 | 8 | 9 |
|---|---|---|---|---|---|---|
| | Parts by weight | | | | | |
| Dicyclohexylamine acetate | 1.5 | 1.3 | 1.0 | | | |
| Dioctylamine | | | | 1.5 | 1.3 | 1.0 |
| N,N'-Dinitroso-N,N'-diphenyl-p-phenylenediamine | | 0.2 | 0.5 | | 0.2 | 0.5 |
| Mooney Scorch, minutes: | | | | | | |
| Natural rubber, 121° C | 11.5 | 12.5 | 18.0 | 8.5 | 11.0 | 16.5 |
| GR-S rubber, 135° C | 17.5 | 19.0 | 22.5 | 21.5 | 24.0 | 28.0 |

The results of the anti-exposure cracking tests on the GR-S vulcanizates are set forth below:

Table IV

| Stock | Surface Cracking After Flexing in Ozone for— | | | | |
|---|---|---|---|---|---|
| | 48 Hours | 60 Hours | 72 Hours | 96 Hours | 120 Hours |
| 4 | v. slight | v. slight | slight | moderate | severe. |
| 5 | none | none | v. slight | slight | moderate. |
| 6 | do | do | none | v. slight | slight. |
| 7 | v. slight | v. slight | v. slight | moderate | severe. |
| 8 | none | none | do | slight | slight. |
| 9 | do | none | none | none | v. slight. |

Note that a small amount of a nitroso aromatic amine, either added to an aliphatic amine (Table II) or in place of part of the amine (Table IV) significantly increases the resistance of GR-S rubber to exposure cracking. Natural rubber containing these combinations was even more resistant to exposure cracking but the combinations were not significantly better than the aliphatic amine alone.

The combination of an amine and a nitroso aromatic amine is effective to inhibit the aging of sulfur vulcanizable rubbers. A synergistic effect takes place so that the mixtures are superior to the same amount of either ingredient alone. These properties are illustrated by further embodiments of the invention wherein stocks were compounded from the natural rubber base described above vulcanized by heating in a press and the optimum cures artificially aged by heating in a circulating air oven at 100° C. The tensile strength after aging was determined as well as the tensile strength of the unaged stocks and the percentage retained after aging calculated. Typical data are tabulated below:

Table V

| Stock | 10 | 11 | 12 | 13 | 14 |
|---|---|---|---|---|---|
| | Parts by weight | | | | |
| Dicyclohexylamine acetate | 1.0 | | 0.4 | 0.6 | 0.8 |
| N,N'-Dinitroso-N,N'-diphenyl-p-phenylenediamine | | 1.0 | 0.6 | 0.4 | 0.2 |
| Percent Tensile Strength Retained After aging 72 hrs | 51.6 | 46.5 | 57.0 | 56.7 | 59.9 |

Table VI

| Stock | 15 | 16 | 17 | 18 | 19 | 20 |
|---|---|---|---|---|---|---|
| | Parts by weight | | | | | |
| Dicyclohexylamine acetate | 1.0 | | 0.2 | 0.4 | 0.6 | 0.8 |
| N-Nitroso-polymerized 1,2-dihydro-2,2,4-trimethylquinoline | | 1.0 | 0.8 | 0.6 | 0.4 | 0.2 |
| Percent Tensile Strength Retained After aging 72 hrs | 33.6 | 33.4 | 38.6 | 41.5 | 40.9 | 40.2 |

Table VII

| Stock | 21 | 22 | 23 | 24 |
|---|---|---|---|---|
| | Parts by weight | | | |
| Dicyclohexylamine acetate | 1.0 | | 0.6 | 0.8 |
| Nitroso diphenylamine | | 1.0 | 0.4 | 0.2 |
| Percent Tensile Strength Retained After aging 48 Hrs | 49.7 | 33.1 | 51.7 | 59.7 |

Table VIII

| Stock | 25 | 26 | 27 | 28 | 29 |
|---|---|---|---|---|---|
| | Parts by weight | | | | |
| Morpholine | 1.0 | | 0.4 | 0.6 | 0.8 |
| N,N'-Dinitroso-N,N'-diphenyl-p-phenylenediamine | | 1.0 | 0.6 | 0.4 | 0.2 |
| Percent Tensile Strength Retained After aging 48 Hrs | 57.7 | 64.2 | 67.3 | 72.9 | 63.1 |

Table IX

| Stock | 30 | 31 | 32 | 33 | 34 | 35 |
|---|---|---|---|---|---|---|
| | Parts by weight | | | | | |
| Cyclohexylamine | 1.0 | | 0.2 | 0.4 | 0.6 | 0.8 |
| N-Nitroso-polymerized 1,2-dihydro-2,2,4-trimethylquinoline | | 1.0 | 0.8 | 0.6 | 0.4 | 0.2 |
| Percent Tensile Strength Retained After Aging 48 Hrs | 42.8 | 52.3 | 53.0 | 56.9 | 58.2 | 66.1 |

Table X

| Stock | 36 | 37 | 38 | 39 |
|---|---|---|---|---|
| | Parts by weight | | | |
| Triethanolamine | 1.0 | | 0.2 | 0.6 |
| N-Nitroso-polymerized 1,2-dihydro-2,2,4-trimethylquinoline | | 1.0 | 0.8 | 0.4 |
| Percent Tensile Strength Retained After Aging 48 Hrs | 36.3 | 43.4 | 46.4 | 55.7 |

The addition of nitroso aromatic amines to stocks containing delayed action sulfenamide accelerators is a valuable technique for preventing prevulcanization. The problem became acute with the development of furnace blacks which lack the inherent retarding properties of channel blacks. However, the nitroso aromatic amines usually impart poor hysteresis properties. The heat buildup and compression set are high. Nevertheless, the effect can be compensated by using the nitroso aromatic amine in conjunction with an aliphatic amine. Typical results are illustrated by tests on the following compositions:

| Stock | 40 | 41 |
|---|---|---|
| | Parts by weight | |
| Smoked sheets | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| N,N'-Dinitroso-N,N'-diphenyl-p-phenylenediamine | 1.5 | 1.5 |
| N-Diisopropyl-2-benzothiazolesulfenamide | 0.4 | 0.4 |
| Dicyclohexylamine | | 0.4 |

The heat generation of these compositions was evaluated by means of a Goodrich flexometer according to A.S.T.M. Method D632-52T employing a load of 175 pounds per square inch and a frequency of 30 cycles per second, 0.175 inch amplitude and a base temperature of 100° C. Both the temperature rise and the permanent set after flexing are recorded below:

Table XI

|  | Stock 40 | Stock 41 |
|---|---|---|
| Temperature rise_____degrees__ | 35 | 25 |
| Permanent set_____ | .192 | .134 |

It will be appreciated that the amine and nitrosoamine may be mixed together before adding to the rubber or added as separate ingredients. The amounts used will depend upon the particular rubber composition and the results desired. In general at least 10% of nitroso aromatic amine should be present in the mixture and usually 20 to 80% nitroso aromatic amine with 80 to 20% of aliphatic amine. The total amount of these ingredients used can also vary. The results have been somewhat better when the aliphatic amine and nitroso aromatic amine were admixed before addition to the rubber. The two ingredients are readily compatible in all proportions and yield stable homogeneous compositions. The rubber may be treated with the anti-degradation agents by Banbury mixing or milling or by addition to rubber latex or even by application to the surface of crude or vulcanized rubber.

While the invention has been illustrated by compositions in which elemental sulfur was the vulcanizing agent, other vulcanizing systems are applicable, as for example N,N'-dithioamines. N,N'-dithiobis morpholine is a satisfactory vulcanizing agent. Any sulfur vulcanizing agent is suitable whether in the form of elemental sulfur or selenium or a sulfur compound which releases sulfur at vulcanizing temperature. The sulfur level can be varied to achieve particular advantages. For example even better aging stocks result from reducing the sulfur. About 1.4 parts is optimum for GR-S and about 1.0 part is optimum for natural rubber. As is well known, the base stocks are then deficient in flexing properties but the combination of aliphatic amine and nitroso aromatic amine overcomes this deficiency. Similarly, other sulfur vulcanizable rubbers may be used in the practice of the invention. These include homopolymers and copolymers of diene hydrocarbons. A variety of sulfur vulcanizable diene hydrocarbon rubbers are known, several of which have achieved commercial importance and may be used to advantage in practice of the invention.

It is intended to cover all changes and modifications of the examples of the invention herein chosen for purposes of disclosure which do not constitute departures from the spirit and scope of the invention.

What is claimed is:

1. A sulfur vulcanizable diene hydrocarbon rubber composition having incorporated therein a small amount sufficient to inhibit degradation of the rubber of a synergistic antidegradant composed of a nitrosoaromatic amine selected from the class consisting of N-nitrosodiarylamines, lower alkyl and lower alkoxy substituted derivatives thereof, N-nitroso-N-aralkyl aromatic amines, N-nitroso-N-alkyl aromatic amines, N-nitroso-p-phenylenediamines both nitrogens of which are further substituted by a hydrocarbon radical containing at least three but not more than twelve carbon atoms, N-nitroso derivatives of the reaction product of diphenylamine and acetone and N-nitroso trimethyldihydroquinolines and a substituted ammonia compound selected from the class consisting of amines and salts thereof, the amine being selected from a class consisting of morpholine, dicyclohexylamine, cyclohexylamine, N-methylcyclohexylamine, N-2-cyanoethylcyclohexylamine, N-2-chloroallylcyclohexylamine, N-(3-chloro-2-butenyl)cyclohexylamine, N-nonenylcyclohexylamine, N-dodecenylcyclohexylamine, N-dodecylcyclohexylamine, N-methyldicyclohexylamine, 2-dicyclohexylaminoethanol, dicyclohexylamino-2-propanone, N-butyldicyclohexylamine, N,N-dimethylcyclohexylamine, dibutylamine, diamylamine, dioctylamine, diethanolamine, triethanolamine, N-2-cyanoethylbutylamine, N-cyclohexylaniline, N-cyclohexyl-p-phenetidine, N-cyclohexyl-o-hydroxyaniline, N-2-cyanoethylaniline, N-2-cyanoethyl-p-toluidine, N-2-cyanoethyl-p-amylaniline, N-ethyl-p-phenetidine, N-benzyl-p-phenetidine, N-2-cyanoethyl-p-phenetidine, N-2-cyanoethyl-o-phenetidine, N-allyl-p-phenetidine, N,N-diethyl-p-phenetidine and N,N-dimethylaniline, the proportion of the nitrosoamine being within the range of about 10–90% and the proportion of the substituted ammonia compound being within the range of about 90–10% of the combined weight.

2. A sulfur vulcanizable diene hydrocarbon rubber composition having incorporated therein a small amount sufficient to inhibit degradation of the rubber of a synergistic antidegradant of claim 1 in which the substituted ammonia compound is dicyclohexylamine.

3. A sulfur vulcanizable diene hydrocarbon rubber having incorporated therein a small amount sufficient to inhibit degration of the rubber of a synergistic antidegradant composed of 20–80% of N-nitrosodiphenylamine and 80–20% of a fatty acid salt of dicyclohexylamine.

4. A sulfur vulcanizable diene hydrocarbon rubber having incorporated therein a small amount sufficient to inhibit degradation of the rubber of a synergistic antidegradant composed of 20–80% of an N-nitroso-p-phenylenediamine both nitrogen atoms of which are further substituted by hydrocarbon radicals containing at least three but not more than twelve carbon atoms and 80–20% of a fatty acid salt of dicyclohexylamine.

5. A sulfur vulcanizable diene hydrocarbon rubber having incorporated therein a small amount sufficient to inhibit degradation of the rubber of a synergistic antidegradant composed of 20–80% of N-nitroso polymerized 1,2-dihydro-2,2,4-trimethylquinoline and 80–20% of a fatty acid salt of dicyclohexylamine.

6. A method of vulcanizing a sulfur vulcanizable diene hydrocarbon rubber which comprises incorporating into the rubber a sulfur vulcanizing agent, a delayed action thiazole accelerator and a small amount sufficient to inhibit degradation of the rubber of a synergistic antidegradant composed of a nitroso aromatic amine selected from the class consisting of N-nitrosodiarylamines, lower alkyl and lower alkoxy substituted derivatives thereof, N-nitroso-N-aralkyl aromatic amines, N-nitroso-N-alkyl aromatic amines, N-nitroso-p-phenylenediamines both nitrogens of which are further substituted by a hydrocarbon radical containing at least three but not more than twelve carbon atoms, N-nitroso derivatives of the reaction product of diphenylamine and acetone and N-nitroso trimethyldihydroquinolines and a substituted ammonia compound selected from the class consisting of amines and salts thereof, the amine being selected from a class consisting of morpholine, dicyclohexylamine, cyclohexylamine, N-methylcyclohexylamine, N-2-cyanoethylcyclohexylamine, N-2-chloroallylcyclohexylamine, N-(3-chloro-2-butenyl)cyclohexylamine, N-nonenylcyclohexylamine, N-dodecenylcyclohexylamine, N-dodecylcyclohexylamine, N-methyldicyclohexylamine, 2-dicyclohexylaminoethanol, dicyclohexylamino-2-propanone, N-butyldicyclohexylamine, N,N-dimethylcyclohexylamine, dibutylamine, diamylamine, dioctylamine, diethanolamine, triethanolamine, N-2-cyanoethylbutylamine, N-cyclohexylaniline, N-cyclohexyl-p-phenetidine, N-cyclohexyl-o-hydroxyaniline, N-2-cyanoethylaniline, N-2-cyanoethyl-p-toluidine, N-2-cyanoethyl-p-amylaniline, N-ethyl-p-phenetidine, N-benzyl-p-phenetidine, N-2-cyanoethyl-p-phenetidine, N-2-cyanoethyl-o-phenetidine, N-allyl-p-phenetidine, N,N-diethyl-p-phenetidine and N,N-dimethylaniline, the proportion of the nitrosoamine being within the range of about 10–90% and the proportion of the substituted ammonia compound being within the range of about 90–10% of the combined weight and heating at vulcanizing temperature.

7. A method of vulcanizing a sulfur vulcanizable diene hydrocarbon rubber according to claim 6 in which the substituted ammonia compound is dicyclohexylamine.

8. A method of vulcanizing a sulfur vulcanizable diene hydrocarbon rubber which comprises incorporating into the rubber a sulfur vulcanizing agent, a delayed action thiazolesulfenamide accelerator and a small amount sufficient to inhibit degradation of the rubber of a synergistic antidegradant composed of 20–80% of N-nitrosodiphenylamine and 80–20% of a fatty acid salt of dicyclohexylamine and heating at vulcanizing temperature.

9. A method of vulcanizing a sulfur vulcanizable diene hydrocarbon rubber which comprises incorporating into the rubber a sulfur vulcanizing agent, a delayed action thiazolesulfenamide accelerator and a small amount sufficient to inhibit degradation of the rubber of a synergistic antidegradant composed of 20–80% of an N-nitroso-p-phenylenediamine both nitrogen atoms of which are further substituted by hydrocarbon radicals containing at least three but not more than twelve carbon atoms and 80–20% of a fatty acid salt of dicyclohexylamine and heating at vulcanizing temperature.

10. A method of vulcanizing a sulfur vulcanizable diene hydrocarbon rubber which comprises incorporating into the rubber a sulfur vulcanizing agent, a delayed action thiazolesulfenamide accelerator and a small amount sufficient to inhibit degradation of the rubber of a synergistic antidegradant composed of 20–80% of N-nitroso polymerized 1,2-dihydro-2,2,4-trimethylquinoline and 80–20% of a fatty acid salt of dicyclohexylamine and heating at vulcanizing temperature.

References Cited in the file of this patent

UNITED STATES PATENTS

| | | |
|---|---|---|
| 1,945,577 | Ter Horst | Feb. 6, 1934 |
| 2,095,921 | Clifford | Oct. 12, 1937 |
| 2,342,136 | Gibbs | Feb. 22, 1944 |
| 2,562,803 | Mankowich | July 31, 1951 |
| 2,645,674 | Kinney | July 14, 1953 |
| 2,729,690 | Oldenburg | Jan. 3, 1956 |
| 2,729,691 | De Pree | Jan. 3, 1956 |

FOREIGN PATENTS

| | | |
|---|---|---|
| 492,803 | Great Britain | Sept. 27, 1938 |